(12) United States Patent
Legler

(10) Patent No.: US 10,915,576 B2
(45) Date of Patent: Feb. 9, 2021

(54) HIGH PERFORMANCE BLOOM FILTER

(71) Applicant: SAP SE, Walldorf (DE)

(72) Inventor: Thomas Legler, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/364,509

(22) Filed: Mar. 26, 2019

(65) Prior Publication Data

US 2020/0311139 A1    Oct. 1, 2020

(51) Int. Cl.
*G06F 16/90* (2019.01)
*G06F 16/901* (2019.01)
*G06F 16/903* (2019.01)
*G06F 12/0868* (2016.01)

(52) U.S. Cl.
CPC ...... *G06F 16/9014* (2019.01); *G06F 12/0868* (2013.01); *G06F 16/903* (2019.01)

(58) Field of Classification Search
CPC . G06F 16/9014; G06F 16/903; G06F 12/0868
USPC ....................................................... 711/216
See application file for complete search history.

(56) References Cited

U.S. PATENT DOCUMENTS

2008/0059462 A1*  3/2008  Millett ............... G06F 16/2264
2016/0147806 A1*  5/2016  Blanco ............... G06F 16/2272
                                                        707/745

* cited by examiner

*Primary Examiner* — Hua J Song
(74) *Attorney, Agent, or Firm* — Mintz Levin Cohn Ferris Glovsky and Popeo, P.C.

(57) ABSTRACT

A method may include identifying, based on a first hash representation of a value, a first cache line corresponding to the value. A first bit and a second bit in the cache line may be identified as corresponding to the value based on a second hash representation of the value. The first bit may be identified based on a first offset in a binary representation of the second hash representation. The second bit may be identified based on a second offset in the binary representation of the second hash representation. Each of the first offset and the second offset may include a portion of the binary digits forming the binary representation of the second hash representation. The value may be determined to be absent from a set of values based the first bit and/or the second bit being set to a first value instead of a second value.

16 Claims, 6 Drawing Sheets

HIGH PERFORMANCE BLOOM FILTER

TECHNICAL FIELD

The subject matter described herein relates generally to database processing and more specifically to an optimized bloom filter for performing database lookups.

BACKGROUND

A database may be configured to store data, for example, in the form electronic data records having one or more fields for holding different values. The data stored in the database may be organized, in accordance with a database schema, into various database objects including, for example, one or more database tables. The database may be coupled with a database management system (DBMS) configured to support a variety of database operations for accessing the data stored in the database. These database operations may include, for example, structured query language (SQL) queries and/or the like.

SUMMARY

Systems, methods, and articles of manufacture, including computer program products, are provided for a high performance bloom filter. In one aspect, there is provided a system. The system may include at least one data processor and at least one memory. The at least one memory may store instructions that result in operations when executed by the at least one data processor. The operations may include: identifying, based at least on a first hash representation of a value, a first cache line corresponding to the value; identifying, based at least on a second hash representation of the value, a first bit and a second bit in the first cache line corresponding to the value, the first bit being identified based at least on a first offset comprising a binary representation of the second hash representation of the value, the second bit being identified based at least on a second offset comprising the binary representation of the second hash representation of the value, and the first offset and the second offset each comprising a portion of a plurality of binary digits forming the binary representation of the second hash representation of the value; and determining, based at least on the first bit and/or the second bit in the first cache line being set to a first value instead of a second value, that the value is absent from a set of values.

In some variations, one or more features disclosed herein including the following features may optionally be included in any feasible combination. In response to the first cache line being absent from a cache, the first cache line may be transferred from a main memory into the cache. The first cache line may be transferred from the main memory by at least storing, in the cache, a copy of the first cache line. The first cache line may be identified as corresponding to the value based at least on a result of applying a mathematical operation to the first hash representation of the value and a total quantity of cache lines available in the main memory. The mathematical operation may be a modulo operation.

In some variations, the value may be determined to be possibly present in the set of values based at least on the first bit and the second bit in the first cache line being set to the second value. An indication may be sent to a client that the value is definitely absent from the set of values or possibly present in the set of values.

In some variations, the first cache line or a second cache line corresponding to another value may be identified based at least on a third hash representation of another value.

In some variations, the first hash representation of the value may be generated by at least applying, to the value, a hash function. The second hash representation of the value may be generated by at least applying, to the value, a same or a different hash function. The value may be modified, prior to applying the same or the different hash function to generate the second hash representation, by at least adding, to the value, one or more constant characters.

In some variations, in response to the value being inserted into the set of values, the first cache line corresponding to the value may be identified based at least on the first hash representation of the value. The first bit and a second bit in the first cache line corresponding to the value may be identified based at least on the second hash representation of the value. The first bit may be identified based at least on the first offset comprising the binary representation of the second hash representation of the value. The second bit may be identified based at least on the second offset comprising the binary representation of the second hash representation of the value. The first bit and the second bit in the first cache line corresponding to the value may be set to the second value.

In some variations, the set of values may include at least a portion of data stored in a database. A query accessing at least the portion of data stored in the database may be executed based at least on the value being absent from the set of values.

In another aspect, there is provided a method for a high performance bloom filter. The method may include: identifying, based at least on a first hash representation of a value, a first cache line corresponding to the value; identifying, based at least on a second hash representation of the value, a first bit and a second bit in the first cache line corresponding to the value, the first bit being identified based at least on a first offset comprising a binary representation of the second hash representation of the value, the second bit being identified based at least on a second offset comprising the binary representation of the second hash representation of the value, and the first offset and the second offset each comprising a portion of a plurality of binary digits forming the binary representation of the second hash representation of the value; and determining, based at least on the first bit and/or the second bit in the first cache line being set to a first value instead of a second value, that the value is absent from a set of values.

In some variations, one or more features disclosed herein including the following features may optionally be included in any feasible combination. The method may further include in response to the first cache line being absent from a cache, transferring, into the cache, the first cache line from a main memory, the first cache line being transferred from the main memory by at least storing, in the cache, a copy of the first cache line. The first cache line may be identified as corresponding to the value based at least on a result of applying a mathematical operation to the first hash representation of the value and a total quantity of cache lines available in the main memory.

In some variations, the method may further include determining that the value is possibly present in the set of values based at least on the first bit and the second bit in the first cache line being set to the second value.

In some variations, the method may further include: generating the first hash representation of the value by at least applying, to the value, a hash function; and generating the second hash representation of the value by at least applying, to the value, a same or a different hash function. The value may be modified, prior to applying the same or the different hash function to generate the second hash representation, by at least adding, to the value, one or more constant characters.

In some variations, the method may further include: responding the value being inserted into the set of values by at least identifying, based at least on the first hash representation of the value, the first cache line corresponding to the value, identifying, based at least on the second hash representation of the value, the first bit and a second bit in the first cache line corresponding to the value, the first bit being identified based at least on the first offset comprising the binary representation of the second hash representation of the value, and the second bit being identified based at least on the second offset comprising the binary representation of the second hash representation of the value, and setting, to the second value, the first bit and the second bit in the first cache line corresponding to the value.

In another aspect, there is provided a computer program product that includes a non-transitory computer readable storage medium. The non-transitory computer-readable storage medium may include program code that causes operations when executed by at least one data processor. The operations may include: identifying, based at least on a first hash representation of a value, a first cache line corresponding to the value; identifying, based at least on a second hash representation of the value, a first bit and a second bit in the first cache line corresponding to the value, the first bit being identified based at least on a first offset comprising a binary representation of the second hash representation of the value, the second bit being identified based at least on a second offset comprising the binary representation of the second hash representation of the value, and the first offset and the second offset each comprising a portion of a plurality of binary digits forming the binary representation of the second hash representation of the value; and determining, based at least on the first bit and/or the second bit in the first cache line being set to a first value instead of a second value, that the value is absent from a set of values.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wireless area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a bloom filter for performing a lookup in a database, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
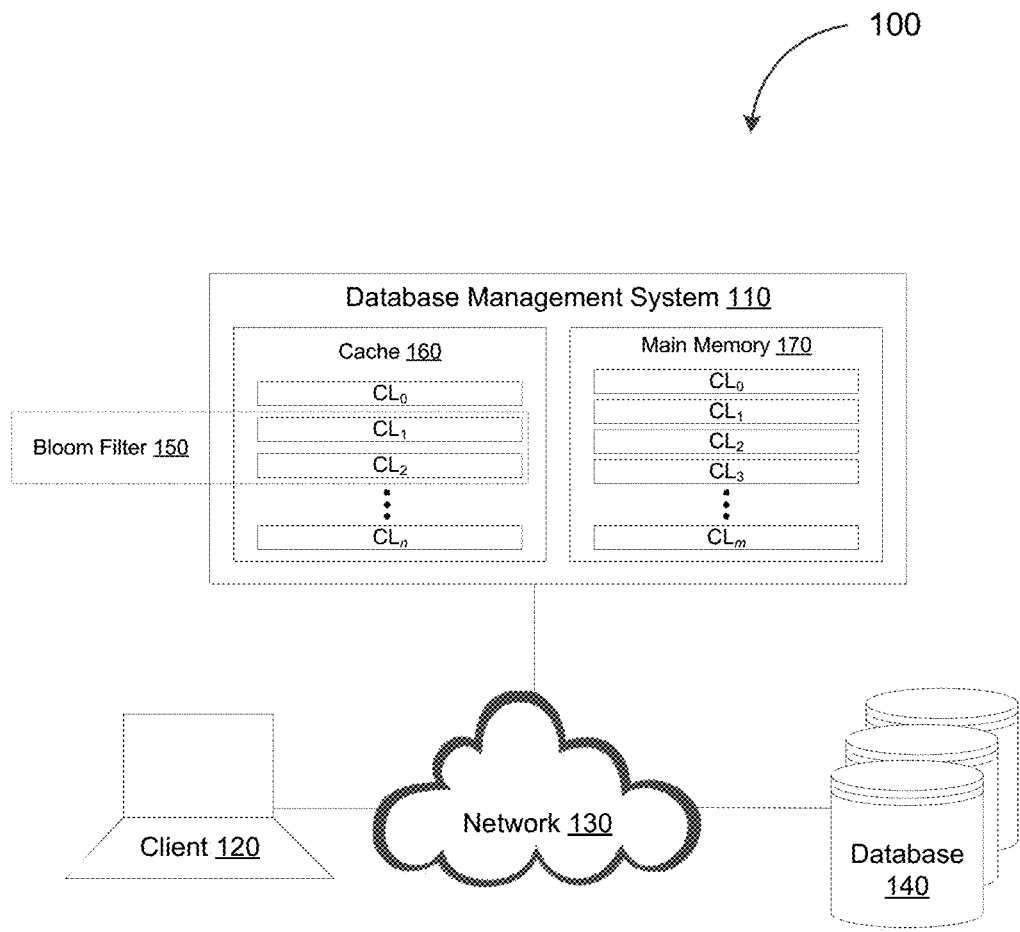
FIG. 1 depicts a system diagram illustrating a database system, in accordance with some example embodiments.

A client may interact with a database management system (DBMS) in order to access data stored in a database coupled with the database management system (DBMS). For example, the client may send, to the database management system, a request that requires the database management system to determine whether a value is present in the database. The database management system may determine whether the value is present in the database by searching the database to locate the value. However, the search may require an excessive quantity of expensive disk access and may consume significant bandwidth if the search is performed over a network. As such, in some example embodiments, a probabilistic data structure such as, for example, a bloom filter and/or the like, may be used to determine whether the value is present in the database without performing a search of the database. For instance, the probabilistic data structure may be a bloom filter. A bloom filter may be a bit vector in which one or more bits are set (e.g., from "0" to "1") to represent the values that are present in a set of values such as, for example, at least a portion of the data stored in the database. Accordingly, instead of searching the database for the value, whether the value is present in the database may be determined based on whether the bits corresponding to the value are set in the bloom filter. The bloom filter may indicate that the value is possibly present in the database if the bits corresponding to the value are set in the bloom filter. Alternatively, the bloom filter may indicate that the value is definitely not present in the database if the bits corresponding to the value are not set (e.g., remains "0") in the bloom filter.

In some example embodiments, a bloom filter may be implemented as one or more cache lines, which may be blocks of memory having a fixed size (e.g., 64 bytes or 512 bits) for transferring data from a main memory to a cache. As noted, a bloom filter may be a bit vector in which one or more bits are set (e.g., from "0" to "1") to represent the values present in a set of values such as, for example, at least a portion of the data stored in a database. Accordingly, when a value is stored in the database, the bloom filter may be updated by identifying a cache line corresponding to the value and setting, in the cache line, the bits corresponding to the value. Furthermore, to determine whether the value is present in the database, the bloom filter may be queried by at least identifying the cache line corresponding to the value and determining whether the bits corresponding to the value are set (e.g., to "1") in the cache line. It should be appreciated that a cache miss may occur if the cache line corresponding to the value is not already present in the cache. In the event of a cache miss, the absent cache line may be transferred from the main memory to the cache such that the cache line is available in the cache for responding to subsequent queries to the bloom filter, which are likely to require the same cache line.

In some example embodiments, the cache line corresponding to a value may be determined based at least on a first hash representation of the value. For example, the cache line corresponding to the value may be determined based on a result of applying a mathematical operation (e.g., a modulo operation and/or the like) to the first hash representation of the value and a total quantity of cache lines available in the main memory. Meanwhile, the bits in the cache line that are set in order to represent the value may be determined based on a second hash representation of the value. In order for the second hash representation to be different from the first hash representation, the second hash representation may be generated based on the value modified, for example, by the addition of one or more constant characters. A binary representation of that second hash representation may be divided into a series of offsets, each of which including a portion of the binary representation that maps to one of the bits in the cache line. It should be appreciated that using offsets in a hash representation of a value to identify which bits to set in a cache line to represent the value may require less computational resources than identifying the each bit based a different hash representation of the value. The reduction in computational resources may be realized, for example, by using a single instruction, multiple data (SIMD) parallel computing architecture to determine the bits to set in the cache line.

FIG. 1 depicts a system diagram illustrating a database system 100, in accordance with some example embodiments. Referring to FIG. 1, the analytics system 100 may include a database management system (DBMS) 110, a client 120, and a database 140. As shown in FIG. 1, the database management system 110, the client 120, and the database 140 may be communicatively coupled via a network 130. The network 130 may be any wired and/or wireless network including, for example, a wide area network (WAN), a local area network (LAN), a virtual local area network (VLAN), a public land mobile network (PLMN), the Internet, and/or the like. Meanwhile, the database 140 may be any type of database including, for example, a graph database, an in-memory database, a relational database, a non-SQL (NoSQL) database, and/or the like.

The client 120 may interact with the database management system 110 in order to access data stored in the database 140. For example, the client 120 may send, to the database management system 110, a request that requires the database management system 110 to determine whether a value is present in the database 140. In some example embodiments, instead of searching the database 140 to locate the value, the database management system 110 may query a bloom filter 150 to determine whether the value is probably present in the database 140 or definitely absent from the database 140. The client 120 may request to execute a query operating on data stored in the database 140. As such, the database management system 110 may execute the query based at least on whether the bloom filter 150 indicates that the value is probably present in the database 140 or definitely absent from the database 140. For instance, the database management system 110 may store the value in the database 140 if the bloom filter 150 indicates that the value is definitely not present in the database 140. Alternatively and/or additionally, the database management system 110 may attempt to retrieve the value from the database 140 if the bloom filter 150 indicates that the value is probably present in the database. The database management system 110 may send, to the client 120, an indication that the value is probably present in the database 140 or definitely absent from the database 140.

Referring again to FIG. 1, the database management system 100 may include a cache 160 and a main memory 170. Data stored in the main memory 170 may be transferred to the cache 160 in one or more cache lines, each of which being a block of memory having a fixed size (e.g., 64 bytes or 512 bits). The cache 160 may be configured to accommodate some but not all of the data stored in the main memory 170. For example, as shown in FIG. 1, the cache 160 may hold up to an n quantity of cache lines, which may be some but not all of an m quantity of cache lines in the main memory 170 (e.g., m>>n). A cache line such as, for example, a first cache line $CL_0$, a second cache line $CL_1$, a third cache line $CL_2$, and/or the like, may be transferred from the main memory 170 to the cache 160 due to a cache miss at the cache 160. It should be appreciated that a cache miss may occur when a request from the client 120 requires data from, for example, the first cache line $CL_0$, the second cache line $CL_1$, and/or the third cache line $CL_2$ but the first cache line $CL_0$, the second cache line $CL_1$, and/or the third cache line $CL_2$ are not present in the cache 160. The first cache line $CL_0$, the second cache line $CL_1$, and/or the third cache line $CL_2$ may be transferred from the main memory 170 to the cache 160 by at least storing, in the cache 160, a copy of the first cache line $CL_0$, the second cache line $CL_1$, and/or the third cache line $CL_2$.

In some example embodiments, the bloom filter 150 may be implemented using one or more cache lines including, for example, the second cache line $CL_1$, the third cache line $CL_2$, and/or the like. Accordingly, one or more bits in the second cache line $CL_1$ and/or the third cache line $CL_2$ may be set (e.g., from "0" to "1") to represent one or more values present in a set of values such as, for example, at least a portion of the data stored in the database 140. Moreover, the bloom filter 150 may be a probabilistic data structure that enables the database management system 110 to determine whether a value is possibly present or definitely not present in the database 140. For example, the bloom filter 150 may indicate that a value is possibly present in the database 140 if the bits corresponding to the value are set in the second cache line $CL_2$ or the third cache line $CL_2$. Alternatively, the bloom filter 150 may indicate that the value is definitely not present in the database 140 if the bits corresponding to the value are not set (e.g., remains "0") in the second cache line $CL_1$ or the third cache line $CL_2$.

In some example embodiments, when a value is added to a set of values such as, for example, at least a portion of the data stored the database 140, the bloom filter 150 may be updated by at least identifying a cache line corresponding to the value and setting, in the cache line, the bits corresponding to the value. For example, the database management system 110 may, in response to storing a value in the database 140, identify the second cache line $CL_1$ (or a different cache line) as corresponding to the value and set, in the second cache line $CL_1$, the bits corresponding to the value. Alternatively and/or additionally, to determine whether the value is present in the database, the bloom filter 150 may be queried by at least identifying a cache line corresponding to the value and determining whether the bits corresponding to the value are set (e.g., to "1") in the cache line. For instance, the database management system 110 may, in response to a request from the client 120, determine whether a value is present in the database 140 by at least identifying the second cache line $CL_1$ (or a different cache line) as corresponding to the value and determine whether the bits corresponding to the value are set in the second cache line $CL_1$. It should be appreciated that this request from the client 120 may trigger a cache miss at the cache 160 if the second cache line $CL_1$ identified as corresponding to the value is absent from the cache 160. In response to the cache miss, the second cache line $CL_1$ may be transferred from the main memory 170 to the cache 160 prior to determining whether the bits corresponding to the value are set in the second cache line $CL_1$. The second cache line $CL_1$ may be transferred from the main memory 170 to the cache 160 by at least storing, in the cache 160, a copy of the second cache line $CL_1$.

In some example embodiments, the database management system 110 may identify the second cache line $CL_1$ (or a different cache line) as corresponding to a value based at least on a first hash representation of the value. For example, the second cache line $CL_1$ may be identified based on a result of applying a mathematical operation (e.g., a modulo operation and/or the like) to the first hash representation of the value and a total quantity of cache lines available in the main memory 170 (e.g., the m quantity of cache lines). Meanwhile, the bits in the second cache line $CL_1$ that are set in order to represent the value may be determined based on a second hash representation of the value. In order for the second hash representation to be different from the first hash representation, the second hash representation may be generated based on the value modified, for example, by the addition of one or more constant characters. The same constant characters may be added to modify other values before determining the second hash representation of these values. A binary representation of that second hash representation may be divided into a series of offsets, each of which including a fixed quantity of bits that maps to one of the bits in the second cache line $CL_1$.

As noted, the bloom filter 150 may be a probabilistic data structure that enables the database management system 110 to determine whether a value is possibly present or definitely not present in the database 140. Accordingly, it should be appreciated that the database management system 110 may be able to make this determination based on the information stored in the second cache line $CL_1$. For example, the database management system 110 may determine whether a value corresponding to the second cache line $CL_1$ is possibly present or definitely not present in the database 140 based at least on the bits that are set (or not set) in the second cache line $CL_1$.

Figure 2:
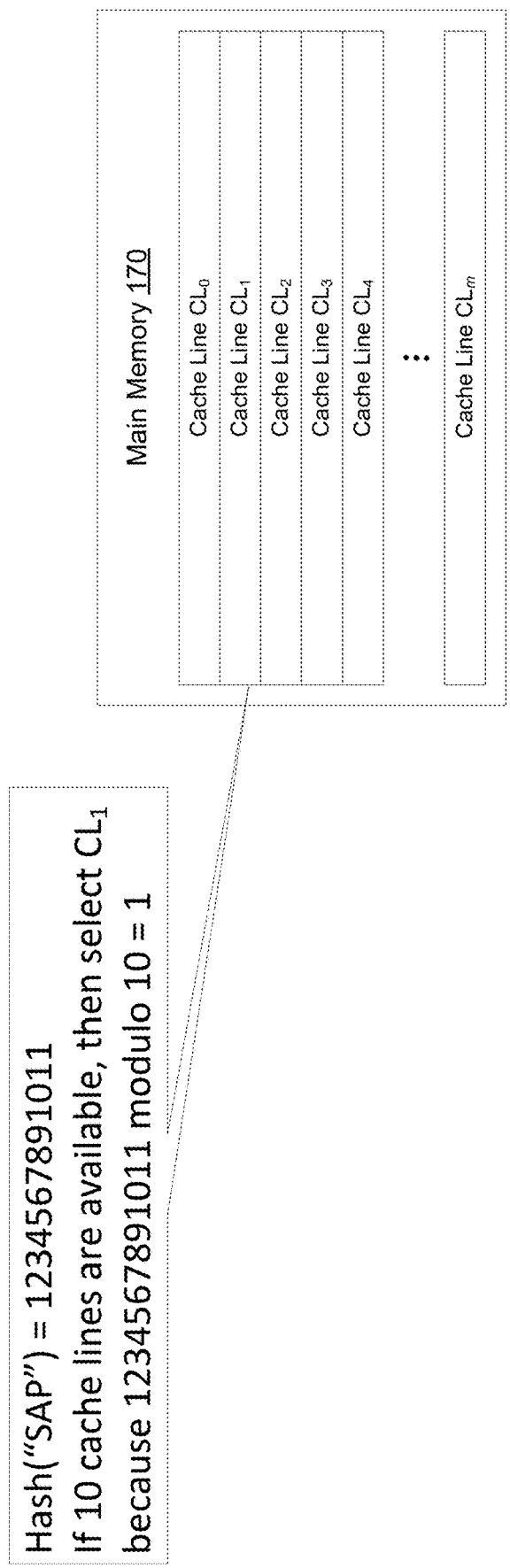
FIG. 2 depicts the identification of a cache line for representing a value, in accordance with some example embodiments.

To further illustrate, FIG. 2 depicts the identification of a cache line for representing a value, in accordance with some example embodiments. As noted, the main memory 170 may include the m quantity of cache lines. One or more the m quantity of cache lines in the main memory 170 may be used to implement the bloom filter 150 including, as shown in FIG. 1, the second cache line $CL_1$, the third cache line $CL_2$, and/or the like. To identify one of the m quantity of cache lines as corresponding to a value (e.g., "SAP"), the database management system 110 may perform a mathematical operation (e.g., a modulo operation) on a first hash representation of the value (e.g., 1234567891011) and the quantity m of cache lines in the main memory 170. For example, the database management system 110 may generate the first hash representation of the value (e.g., "SAP") by applying a hash function to the value. In the example shown in FIG. 2, the second cache line $CL_1$ may be identified as corresponding to the value (e.g. "SAP") based on a result of a modulo operation (e.g., 1) performed on the first hash representation of the value (e.g., 1234567891011) and the total quantity of cache lines available in the main memory 170 (e.g., m). As noted, the second cache line $CL_1$ may be absent from the cache 160, in which case the second cache line $CL_1$ may be transferred from the main memory 170 to the cache 160 before the database management system 110 determines whether the bits corresponding to the value (e.g., "SAP") are set in the second cache line $CL_1$.

The bits in the second cache line $CL_1$ that correspond to the value (e.g., "SAP") may be determined based on a second hash representation of the value. In order to generate the second hash representation of the value to be different from the first hash representation of the value (e.g., 4564654231056505606 instead of 1234567891011), the database management system 110 may generate the second hash representation of the value by at least applying, to the value, a different hash function than the one used to generate the first hash representation of the value. Alternatively and/or additionally, the database management system 110 may generate the second hash representation by applying the same and/or different hash function to the value modified by the addition of one or more constant characters (e.g., "SAPSE" instead of "SAP"). As noted, other values may be modified by the addition of the same constant characters (e.g., "SE") before the database management system 110 generates the second hash representation of these values.

In some example embodiments, the first hash representation and the second hash representation of the value may be computed using any hash function including, for example, a mathematical operation (e.g., a modulo operation and/or the like), MD5, CRC-32, Murmur-Hash, SHA-1, and/or the like. The choice in hash function may be dependent on a tradeoff between computational efficiency and the accuracy of the bloom filter 150 (e.g., probability of false positives). Furthermore, the first hash representation and the second hash representation of a value (e.g. "SAP") may be computed by looping over the individual characters forming the value. For example, to compute the first hash representation and/or the second hash representation of the value "SAP" may include first determining a hash representation for the character "S" before using the hash representation of the character "S" as a base for calculating the hash representation of the next character "A." The hash representation of "SA"

may subsequently be used to calculate the hash representation for the character "P." Accordingly, the second hash representation of the value "SAP," which may be computed for the value modified with the addition of the constant characters "SE," may be determined with the hash representation of the value "SAP" as a base for calculating the hash representation of the character "S" and the hash representation of the value "SAPS" as a base for calculating the hash representation of the character "E."

Figure 3:
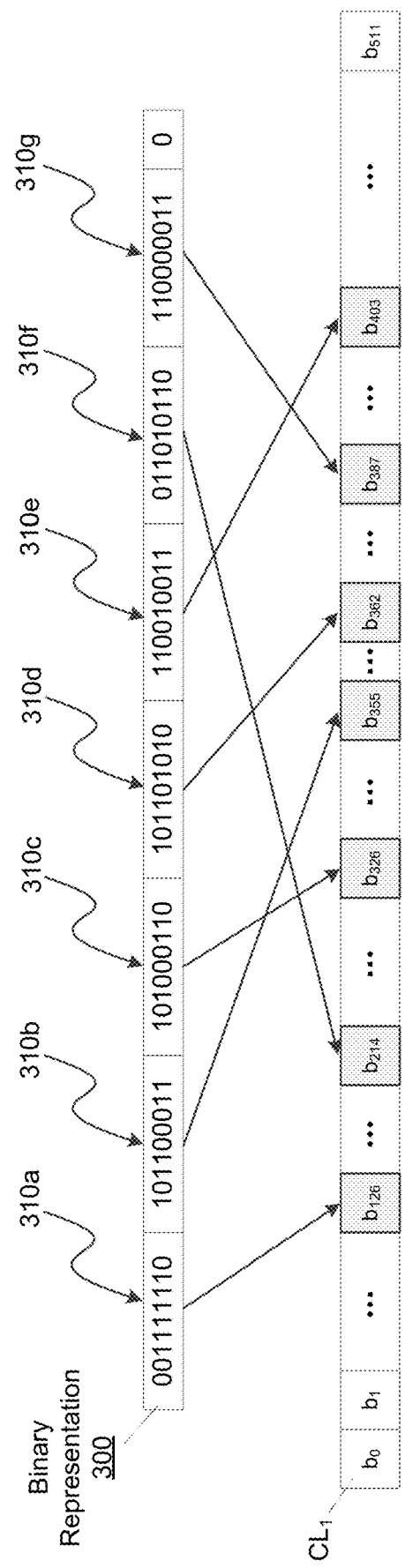
FIG. 3 depicts an example of bits set in a cache line to represent a value, in accordance with some example embodiments.

In order to identify the bits in the second cache line $CL_1$ that correspond to the value (e.g., "SAP"), the database management system 110 may further divide a binary representation of the second hash representation of the value (e.g., 4564654231056505606) into a series of offsets. Each offset may include a portion of the binary representation that maps to one of the bits in the second cache line $CL_1$. To further illustrate, FIG. 3 depicts an example of bits set in the second cache line $CL_1$ to represent a value, in accordance with some example embodiments. Referring to FIG. 3, the second cache line $CL_1$ may include, for example, 64 bytes or 512 bits (e.g., $b_0$, $b_1$, $b_2$, . . . , $b_{511}$). Meanwhile, a binary representation 300 of the second hash representation (e.g., 4564654231056505606) of the value (e.g., "SAPSE") may be divided into 7 offsets including, for example, a first offset 310a, a second offset 310b, a third offset 310c, a fourth offset 310d, a fifth offset 310e, a sixth offset 310f, and a seventh offset 310g.

It should be appreciated that the size of the second hash representation of the value may vary (e.g., 128-bit instead of 64-bit). Alternatively and/or additionally, the binary representation 300 of the second hash representation of the value may be divided into a different quantity of offsets. A larger second hash representation and/or a larger quantity of offsets may reduce the probability of the bloom filter 150 returning a false positive in which a value is indicated as being present in the database 140 even though the value is not in fact present in the database 140. Nevertheless, increasing the size of the second hash representation and/or the quantity of offsets may also reduce the computational efficiency of the bloom filter 150 including when the bloom filter 150 is updated to insert a value into the database 140 as well as when the bloom filter 150 is queried to determine whether a value is present in the database 140.

Referring again to FIG. 3, the first offset 310a, the second offset 310b, the third offset 310c, the fourth offset 310d, the fifth offset 310e, the sixth offset 310f, and the seventh offset 310g may each include a portion of a plurality of binary digits forming the binary representation 300 of the second hash representation of the value (e.g., "SAPSE"). For example, the first offset 310a, the second offset 310b, the third offset 310c, the fourth offset 310d, the fifth offset 310e, the sixth offset 310f, and the seventh offset 310g may each include 9 binary digits from the binary representation 300 of the second hash representation of the value (e.g., "SAPSE"). Furthermore, the first offset 310a, the second offset 310b, the third offset 310c, the fourth offset 310d, the fifth offset 310e, the sixth offset 310f, and the seventh offset 310g may each map to a bit in the second cache line $CL_1$.

For example, as shown in FIG. 3, the first offset 310a may include the binary digits "001111110," which have an equivalent decimal value of 126. Accordingly, the first offset 310a may map to the $126^{th}$ bit (e.g., $b_{126}$) in the second cache line $CL_1$. Likewise, the second offset 310b may map to the $355^{th}$ bit (e.g., $b_{355}$) in the second cache line $CL_1$ because the second offset 310b includes the binary digits "101100011" having a corresponding decimal value of 355. The $214^{th}$ bit (e.g., $b_{214}$), the $362^{nd}$ bit (e.g., $b_{362}$), the $387^{th}$ bit (e.g., $b_{387}$), and the $403^{rd}$ bit (e.g., $b_{403}$) in the second cache line $CL_1$ may be set based on the decimal values that corresponding to the binary digits forming the third offset 310c, the fourth offset 310d, the fifth offset 310e, the sixth offset 310f, and the seventh offset 310g.

Accordingly, when the database management system 110 is storing, into the database 140, the value (e.g., "SAP"), the database management system 110 may update the bloom filter 150 by at least identifying the second cache line $CL_1$ as corresponding to the value before setting, in the second cache line $CL_1$, the bits $b_{126}$, $b_{214}$, $b_{326}$, $b_{355}$, $b_{362}$, $b_{387}$, and $b_{403}$ corresponding to the value. Alternatively and/or additionally, the database management system 110 may determine whether the value (e.g., "SAP") is present in the database 140 by at least identifying the second cache line $CL_1$ as corresponding to the value and determining whether the bits $b_{126}$, $b_{214}$, $b_{326}$, $b_{355}$, $b_{362}$, $b_{387}$, and $b_{403}$ corresponding to the value are set (e.g., to "1") in the second cache line $CL_1$. It should be appreciated that if any of the bits $b_{126}$, $b_{214}$, $b_{326}$, $b_{355}$, $b_{362}$, $b_{387}$, and $b_{403}$ in the second cache line $CL_1$ are not set (e.g., remains "0"), the database management system 110 may determine that the value (e.g., "SAP") is definitely not present in the database 140. By contrast, if all of the bits $b_{126}$, $b_{214}$, $b_{326}$, $b_{355}$, $b_{362}$, $b_{387}$, and $b_{403}$ in the second cache line $CL_1$ are set (e.g., to "1"), the database management system 110 may determine that the value (e.g., "SAP") is possibly present in the database 140.

Figure 4A:
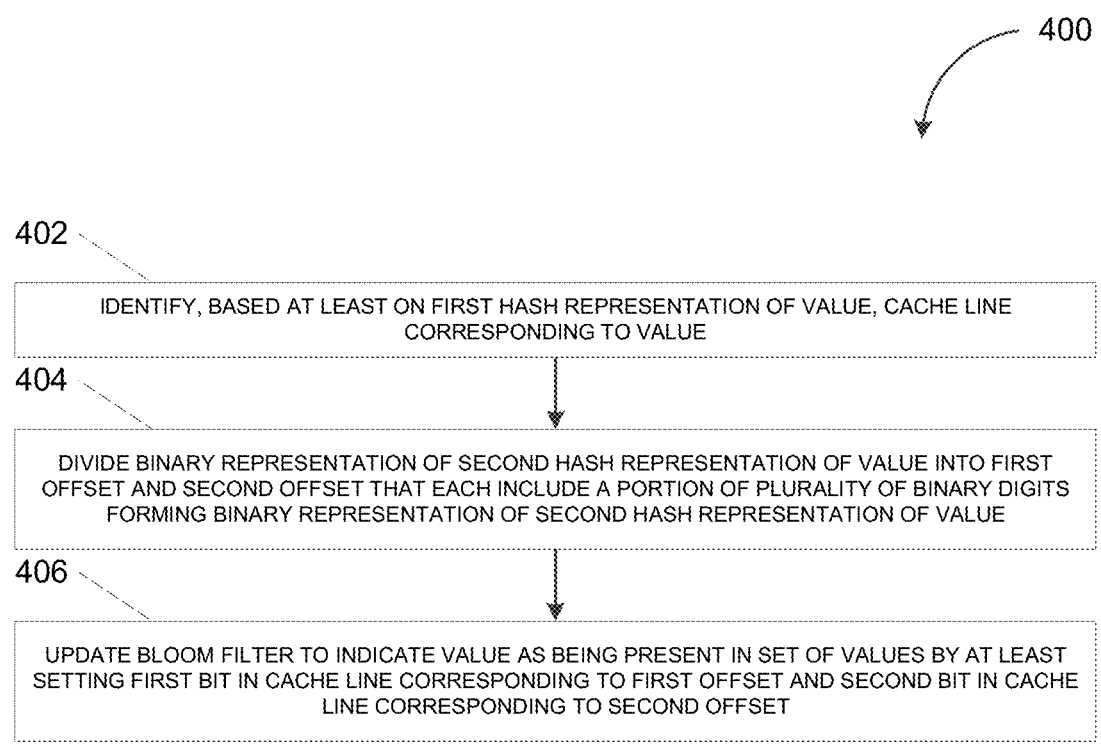
FIG. 4A depicts a flowchart illustrating a process for updating a bloom filter, in accordance with some example embodiments.

FIG. 4A depicts a flowchart illustrating a process 400 for updating a bloom filter, in accordance with some example embodiments. Referring to FIGS. 1-3 and 4A, the process 400 may be performed, for example, by the database management system 110 in order to update the bloom filter 150. The database management system 110 may update the bloom filter 150 in response to a request from the client 120 to insert a value (e.g., "SAP") into a set of values such as, for example, at least a portion of the data stored in the database 140.

At 402, the database management system 110 may identify, based at least on a first hash representation of a value, a cache line corresponding to the value. In some example embodiments, in order to identify a cache line corresponding to a value (e.g., "SAP"), the database management system 110 may generate a first hash representation of a value by applying a hash function to the value. Furthermore, the database management system 110 may apply a mathematical operation (e.g., modulo operation and/or the like) to the first hash representation of the value and a total quantity of available hash lines in the main memory 170). For instance, FIG. 2 shows that the second cache line $CL_1$ may be identified as corresponding to the value (e.g. "SAP") based on a result of a modulo operation (e.g., 1) performed on the first hash representation of the value (e.g., 1234567891011) and the total quantity of cache lines available in the main memory 170 (e.g., m). In the event the second cache line $CL_1$ is absent from the cache 160, the second cache line $CL_1$ may be transferred from the main memory 170 to the cache 160.

At 404, the database management system 110 may divide a binary representation of a second hash representation of the value into a first offset and a second offset that each include a portion of a plurality of binary digits forming the binary representation of the hash representation of the value. In some example embodiments, the bits in the second cache line $CL_1$ that correspond to the value (e.g., "SAP") may be determined based on a second hash representation of the value. In order to generate the second hash representation of the value to be different from the first hash representation of the value (e.g., 4564654231056505606 instead of 1234567891011), the second hash representation of the value may be generated by least applying, to the value, a different hash function than the one used to generate the first hash representation of the value. Alternatively and/or additionally, the second hash representation may be generated by applying the same and/or different hash function to the value modified by the addition of one or more constant characters (e.g., "SAPSE" instead of "SAP").

In some example embodiments, the database management system 110 may further divide a binary representation of the second hash representation of the value (e.g., 4564654231056505606) into a series of offsets. For example, FIG. 3 shows that the binary representation 300 of the second hash representation (e.g., 4564654231056505606) of the value (e.g., "SAPSE") may be divided into 7 offsets including, for example, the first offset 310a, the second offset 310b, the third offset 310c, the fourth offset 310d, the fifth offset 310e, the sixth offset 310f, and the seventh offset 310g. The first offset 310a, the second offset 310b, the third offset 310c, the fourth offset 310d, the fifth offset 310e, the sixth offset 310f, and the seventh offset 310g may each include a portion of a plurality of binary digits forming the binary representation 300 of the second hash representation of the value.

At 406, the database management system 110 may update bloom filter to indicate value as being present in set of values by at least setting a first bit in the cache line corresponding to the first offset and a second bit in the cache line corresponding to the second offset. For example, the binary digits included in each of the first offset 310a, the second offset 310b, the third offset 310c, the fourth offset 310d, the fifth offset 310e, the sixth offset 310f, and the seventh offset 310g may map to one of the bits in the second cache line $CL_1$, which may be set in order to indicate the value (e.g., "SAP") as being present in the database 140. For example, the first offset 310a may map to the $126^{th}$ bit (e.g., $b_{126}$) in the second cache line $CL_1$ because the first offset 310a includes the binary digits "001111110" having an equivalent decimal value of 126. Alternatively and/or additionally, the second offset 310b may map to the $355^{th}$ bit (e.g., $b_{355}$) in the second cache line $CL_1$ because the second offset 310b includes the binary digits "101100011" having a corresponding decimal value of 355. Accordingly, in order to indicate that the value (e.g., "SAP") is present in the database 140, the database management system 110 may update the bloom filter 150 by at least setting the $126^{th}$ bit (e.g., $b_{126}$), the $355^{th}$ bit (e.g., $b_{355}$), the $214^{th}$ bit (e.g., $b_{214}$), the $362^{nd}$ bit (e.g., $b_{362}$), the $387^{th}$ bit (e.g., $b_{387}$), and the $403^{rd}$ bit (e.g., $b_{403}$) in the second cache line $CL_1$.

It should be appreciated that instead of determining multiple hash representations of the value to map the value to bits in the second cache line instead of multiple hash representations of the value, the bits in the second cache line $CL_1$ corresponding to the value are identified based on the offsets included in the binary representation of the second hash representation of the value. As such, the quantity of hash functions that are used to update and/or query the bloom filter 150 may be minimized, thereby increasing the computational efficiency of the bloom filter 150.

In some example embodiments, the database management system 110 may, in response to the insertion of another value into the database 140, update the bloom filter 150 by setting one or more bits in the second cache line $CL_1$ (or a different cache line) corresponding to the other value. It should be appreciated that the database management system 110 may set the exact same bits in the same cache line for multiple different values. As such, the bloom filter 150 may return a false positive in which a value indicated as being present in the database 140 is not in fact present in the database 140. The probability of the bloom filter 150 returning a false positive may be reduced by dividing the binary representation 300 of the second hash representation of the value into a larger quantity of offsets. However, as noted, increasing the quantity of offsets may reduce the computational efficiency of the bloom filter 150 including when the bloom filter 150 is updated to insert a value into the database 140 as well as when the bloom filter 150 is queried to determine whether a value is present in the database 140.

Figure 4B:
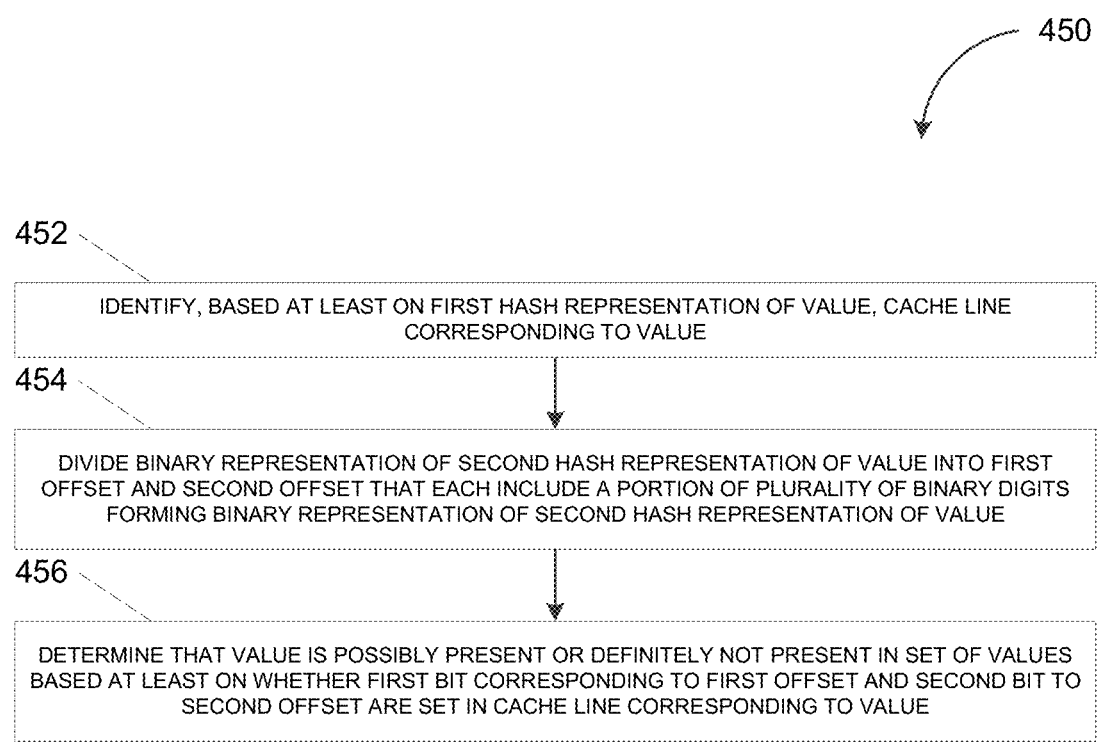
FIG. 4B depicts a flowchart illustrating a process for performing a lookup using a bloom filter, in accordance with some example embodiments.

FIG. 4B depicts a flowchart illustrating a process 450 for performing a lookup using a bloom filter, in accordance with some example embodiments. Referring to FIGS. 1-3 and 4B, the process 450 may be performed, for example, by the database management system 110 in order to perform a lookup using the bloom filter 150. In some example embodiments, the database management system 110 may query the bloom filter 150 in response to a request from the client 120 that requires the database management system 110 to determine whether a value (e.g., "SAP") is present in a set of values including, for example, at least a portion of the data stored in the database 140.

At 452, the database management system 110 may identify, based at least on a first hash representation of a value, a cache line corresponding to the value. In some example embodiments, a cache line corresponding to a value (e.g., "SAP") may be identified based on a first hash representation of a value generated by applying a hash function to the value. Furthermore, in order to identify the cache line corresponding to the value (e.g., "SAP"), the database management system 110 may apply a mathematical operation (e.g., modulo operation and/or the like) to the first hash representation of the value and a total quantity of available hash lines in the main memory 170). In the example shown in FIG. 2, the second cache line $CL_1$ may be identified as corresponding to the value (e.g. "SAP") based on a result of a modulo operation (e.g., 1) performed on the first hash representation of the value (e.g., 1234567891011) and the total quantity of cache lines available in the main memory 170 (e.g., m). In the event the second cache line $CL_1$ is absent from the cache 160, the second cache line $CL_1$ may be transferred from the main memory 170 to the cache 160.

At 454, the database management system 110 may divide a binary representation of a second hash representation of the value into a first offset and a second offset that each include a portion of plurality of binary digits forming the binary representation of the hash representation of the value. In some example embodiments, the database management system 110 may generate the second hash presentation of the value to be different from the first hash representation of the value by applying a different hash function to the value. Alternatively and/or additionally, For example, the database management system 110 may generate the second hash presentation of the value to be different from the first hash representation of the value by applying a same or different hash function to the value modified by the addition of one or more constant characters (e.g., "SAPSE").

In some example embodiments, the database management system 110 may further divide a binary representation of the second hash representation of the value (e.g., 4564654231056505606) into a series of offsets. For example, FIG. 3 shows that the binary representation 300 of the second hash representation (e.g., 4564654231056505606) of the value (e.g., "SAPSE") being divided into 7 offsets including, for example, the first offset 310a, the second offset 310b, the third offset 310c, the fourth offset 310d, the fifth offset 310e, the sixth offset 310f, and the seventh offset 310g, each of which including a portion of a plurality of binary digits forming the binary representation 300 of the second hash representation of the value.

At 456, the database management system 110 may determine that the value is possibly present or definitely not present in a set of values based least on whether a first bit corresponding to the first offset and a second bit corresponding to the second offset are set in cache line corresponding to the value. In some example embodiments, the database management system 110 may query the bloom filter 150 in order to determine whether the value (e.g., "SAP") is present in a set of values such as, for example, at least a portion of the data in the database 140. The bloom filter 150 may be a probabilistic data structure that enables the database management system 110 to determine that the value (e.g., "SAP") is possibly present in the database 140 or definitely not present in the database 140.

In order to determine whether the value (e.g., "SAP") is possibly present in the database 140 or definitely not present in the database 140, the database management system 110 may determine whether the bits corresponding to the value are set in the second cache line $CL_1$ determined to correspond to the value. For example, the bits in the second cache line $CL_1$ corresponding to the value (e.g., "SAP") may include the $126^{th}$ bit (e.g., $b_{126}$), the $355^{th}$ bit (e.g., $b_{355}$), the $214^{th}$ bit (e.g., $b_{214}$), the $362^{nd}$ bit (e.g., $b_{362}$), the $387^{th}$ bit (e.g., $b_{387}$), and the $403^{rd}$ bit (e.g., $b_{403}$). Accordingly, the database management system 110 may determine that the value (e.g., "SAP") is definitely not present in the database 140 if any one of the the $126^{th}$ bit (e.g., $b_{126}$), the $355^{th}$ bit (e.g., $b_{355}$), the $214^{th}$ bit (e.g., $b_{214}$), the $362^{nd}$ bit (e.g., $b_{362}$), the $387^{th}$ bit (e.g., $b_{387}$), and the $403^{rd}$ bit (e.g., $b_{403}$) in the second cache line $CL_1$ are not set (e.g., remains "0"). Alternatively, the database management system 110 may determine that the value (e.g., "SAP") is possibly present in the database 140 if every one of the $126^{th}$ bit (e.g., $b_{126}$), the $355^{th}$ bit (e.g., $b_{355}$), the $214^{th}$ bit (e.g., $b_{214}$), the $362^{nd}$ bit (e.g., $b_{362}$), the $387^{th}$ bit (e.g., $b_{387}$), and the $403^{rd}$ bit (e.g., $b_{403}$) in the second cache line $CL_1$ are set (e.g., to "1").

In some example embodiments, the database management system 110 may query the bloom filter 150 in response to a request from the client 120 that requires the database management system 110 to determine whether the value is present in the database 140. For example, the client 120 may request to execute a query operating on data stored in the database 140. Accordingly, the database management system 110 may execute the query based at least on whether the bloom filter 150 indicates that the value is probably present in the database 140 or definitely absent from the database 140. For instance, the database management system 110 may store the value in the database 140 if the bloom filter 150 indicates that the value is definitely not present in the database 140. Alternatively and/or additionally, the database management system 110 may attempt to retrieve the value from the database 140 if the bloom filter 150 indicates that the value is probably present in the database. The database management system 110 may send, to the client 120, an indication that the value is probably present in the database 140 or definitely absent from the database 140.

Figure 5:
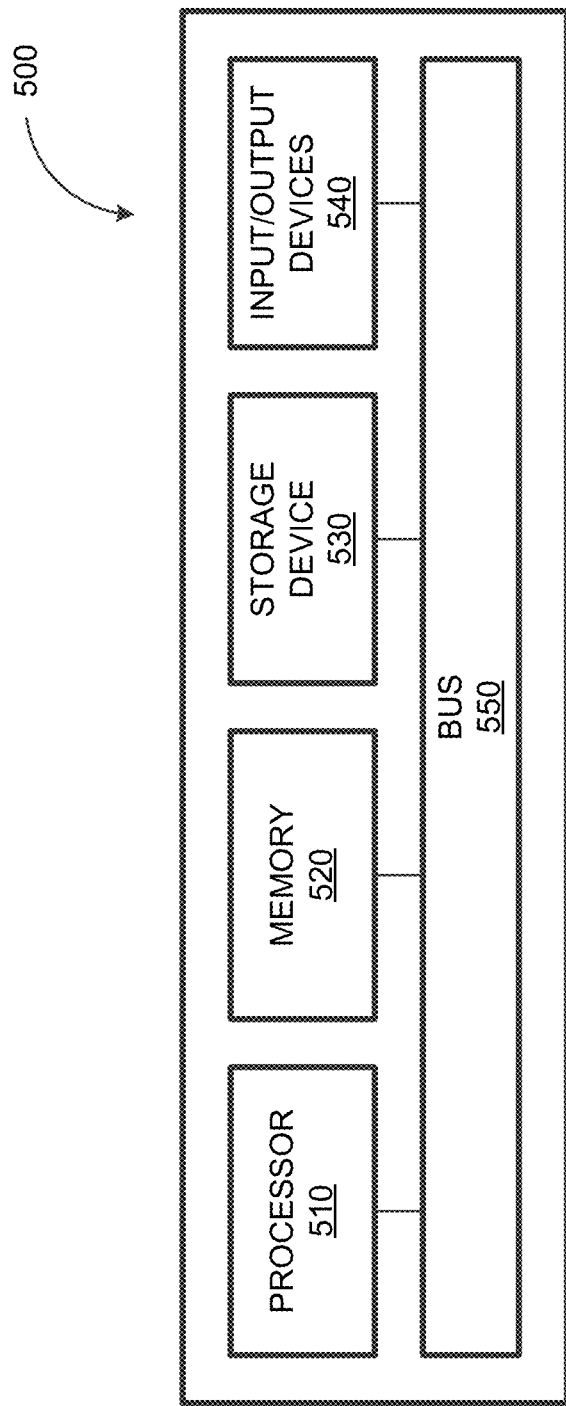
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the database management system 110 and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the database management system 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid-state device, and/or any other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
     generating a first hash representation of a value by at least applying, to the value, a first hash function;
     identifying, based at least on the first hash representation of the value, a first cache line corresponding to the value;
     generating a second hash representation of the value, the second hash representation of the value being generated to be different from the first hash representation of the value by at least applying a second hash function that is different from the first hash function and/or adding, to the value, one or more constant characters to modify the value prior to applying the first hash function or the second hash function;
     identifying, based at least on the second hash representation of the value, a first bit and a second bit in the first cache line corresponding to the value, the first bit being identified based at least on a first offset comprising a binary representation of the second hash representation of the value, the second bit being identified based at least on a second offset comprising the binary representation of the second hash representation of the value, and the first offset and the second offset each comprising a portion of a plurality of binary digits forming the binary representation of the second hash representation of the value; and
     determining, based at least on the first bit and/or the second bit in the first cache line being set to a first value instead of a second value, that the value is absent from a set of values.

2. The system of claim 1, further comprising:
   in response to the first cache line being absent from a cache, transferring, into the cache, the first cache line from a main memory, the first cache line being transferred from the main memory by at least storing, in the cache, a copy of the first cache line.

3. The system of claim 2, wherein the first cache line is identified as corresponding to the value based at least on a result of applying a mathematical operation to the first hash representation of the value and a total quantity of cache lines available in the main memory.

4. The system of claim 3, wherein the mathematical operation comprises a modulo operation.

5. The system of claim 1, further comprising:
determining that the value is possibly present in the set of values based at least on the first bit and the second bit in the first cache line being set to the second value.

6. The system of claim 5, further comprising:
sending, to a client, an indication that the value is definitely absent from the set of values or possibly present in the set of values.

7. The system of claim 1, further comprising:
identifying, based at least on a third hash representation of another value, the first cache line or a second cache line corresponding to the other value.

8. The system of claim 1, further comprising:
responding the value being inserted into the set of values by at least
identifying, based at least on the first hash representation of the value, the first cache line corresponding to the value,
identifying, based at least on the second hash representation of the value, the first bit and a second bit in the first cache line corresponding to the value, the first bit being identified based at least on the first offset comprising the binary representation of the second hash representation of the value, and the second bit being identified based at least on the second offset comprising the binary representation of the second hash representation of the value, and
setting, to the second value, the first bit and the second bit in the first cache line corresponding to the value.

9. The system of claim 1, wherein the set of values comprises at least a portion of data stored in a database.

10. The system of claim 9, further comprising:
executing, based at least on the value being absent from the set of values, a query accessing at least the portion of the data stored in the database.

11. A computer-implemented method, comprising:
generating a first hash representation of a value by at least applying, to the value, a first hash function;
identifying, based at least on the first hash representation of the value, a first cache line corresponding to the value;
generating a second hash representation of the value, the second hash representation of the value being generated to be different from the first hash representation of the value by at least applying a second hash function that is different from the first hash function and/or adding, to the value, one or more constant characters to modify the value prior to applying the first hash function or the second hash function;
identifying, based at least on the second hash representation of the value, a first bit and a second bit in the first cache line corresponding to the value, the first bit being identified based at least on a first offset comprising a binary representation of the second hash representation of the value, the second bit being identified based at least on a second offset comprising the binary representation of the second hash representation of the value, and the first offset and the second offset each comprising a portion of a plurality of binary digits forming the binary representation of the second hash representation of the value; and
determining, based at least on the first bit and/or the second bit in the first cache line being set to a first value instead of a second value, that the value is absent from a set of values.

12. The method claim 11, further comprising:
in response to the first cache line being absent from a cache, transferring, into the cache, the first cache line from a main memory, the first cache line being transferred from the main memory by at least storing, in the cache, a copy of the first cache line.

13. The method of claim 12, wherein the first cache line is identified as corresponding to the value based at least on a result of applying a mathematical operation to the first hash representation of the value and a total quantity of cache lines available in the main memory.

14. The method of claim 11, further comprising:
determining that the value is possibly present in the set of values based at least on the first bit and the second bit in the first cache line being set to the second value.

15. The method of claim 11, further comprising:
responding the value being inserted into the set of values by at least
identifying, based at least on the first hash representation of the value, the first cache line corresponding to the value,
identifying, based at least on the second hash representation of the value, the first bit and a second bit in the first cache line corresponding to the value, the first bit being identified based at least on the first offset comprising the binary representation of the second hash representation of the value, and the second bit being identified based at least on the second offset comprising the binary representation of the second hash representation of the value, and
setting, to the second value, the first bit and the second bit in the first cache line corresponding to the value.

16. A non-transitory computer readable medium storing instructions, which when executed by at least one data processor, result in operations comprising:
generating a first hash representation of a value by at least applying, to the value, a first hash function;
identifying, based at least on the first hash representation of the value, a first cache line corresponding to the value;
generating a second hash representation of the value, the second hash representation of the value being generated to be different from the first hash representation of the value by at least applying a second hash function that is different from the first hash function and/or adding, to the value, one or more constant characters to modify the value prior to applying the first hash function or the second hash function;
identifying, based at least on the second hash representation of the value, a first bit and a second bit in the first cache line corresponding to the value, the first bit being identified based at least on a first offset comprising a binary representation of the second hash representation of the value, the second bit being identified based at least on a second offset comprising the binary representation of the second hash representation of the value, and the first offset and the second offset each comprising a portion of a plurality of binary digits forming the binary representation of the second hash representation of the value; and determining, based at least on the first bit and/or the second bit in the first cache line being set to a first value instead of a second value, that the value is absent from a set of values.

\* \* \* \* \*